US012688605B2

(12) United States Patent
Hawkins et al.

(10) Patent No.: US 12,688,605 B2
(45) Date of Patent: Jul. 21, 2026

(54) COMMUNICATION PROTOCOL FOR INFERENCE SYSTEM

(71) Applicant: Numenta, Inc., Redwood City, CA (US)

(72) Inventors: Jeffrey C. Hawkins, Atherton, CA (US); Subutai Ahmad, Palo Alto, CA (US); Viviane Clay, Mommenheim (DE); Niels Leadholm, Oxford (GB)

(73) Assignee: Numenta, Inc., Menlo Park, CA (US)

( * ) Notice: Subject to any disclaimer, the term of this patent is extended or adjusted under 35 U.S.C. 154(b) by 310 days.

(21) Appl. No.: 18/666,181

(22) Filed: May 16, 2024

(65) Prior Publication Data

US 2024/0420360 A1     Dec. 19, 2024

Related U.S. Application Data

(60) Provisional application No. 63/516,845, filed on Jul. 31, 2023, provisional application No. 63/508,898, filed on Jun. 18, 2023.

(51) Int. Cl.
| | |
|---|---|
| *G06T 7/70* | (2017.01) |
| *H04L 67/12* | (2022.01) |

(52) U.S. Cl.
CPC ............... *G06T 7/70* (2017.01); *H04L 67/12* (2013.01)

(58) Field of Classification Search
CPC .................................. G06T 7/70; H04L 67/12
USPC ....................................................... 382/103
See application file for complete search history.

(56) References Cited

U.S. PATENT DOCUMENTS

| | | | | |
|---|---|---|---|---|
| 11,657,278 | B2 * | 5/2023 | Hawkins | ................. G06F 18/22 |
| | | | | 348/143 |
| 11,720,223 | B2 * | 8/2023 | Kaehler | .............. G06F 3/04815 |
| | | | | 715/848 |
| 11,778,310 | B2 * | 10/2023 | Yadav | .................... H04N 23/64 |
| | | | | 348/207.1 |
| 12,094,192 | B2 * | 9/2024 | Hawkins | ................ G06V 10/82 |
| 2007/0003130 | A1 | 1/2007 | Goerick | |
| 2015/0117760 | A1 | 4/2015 | Wang | |
| 2015/0178931 | A1 | 6/2015 | Gao | |
| 2016/0082597 | A1 | 3/2016 | Gorshechnikov | |
| 2016/0092736 | A1 | 3/2016 | Mai | |
| 2016/0096270 | A1 | 4/2016 | Ibarz Gabardos | |
| 2024/0331424 | A1 * | 10/2024 | Ata | .................. G06V 30/19147 |

* cited by examiner

*Primary Examiner* — Gabriel I Garcia
(74) *Attorney, Agent, or Firm* — WTA IP Law P.C.

(57) ABSTRACT

A common communication protocol (CCP) used across different components of an inference system that recognizes an object and its state, or affect changes in the state of the object to a targeted state, based on sensory input. One or more components may convert information they generate into a format compliant with the CCP for sending to one or more other components. The CCP includes pose information and object information of an object. The pose information indicates the location and the orientation of the object in a common coordinate system, as detected, inferred, predicted or targeted by a component of the inference system. The object information indicates either one or more features of the object, as detected, predicted or targeted, or identification of the object, as inferred or predicted by the component of the inference system.

20 Claims, 7 Drawing Sheets

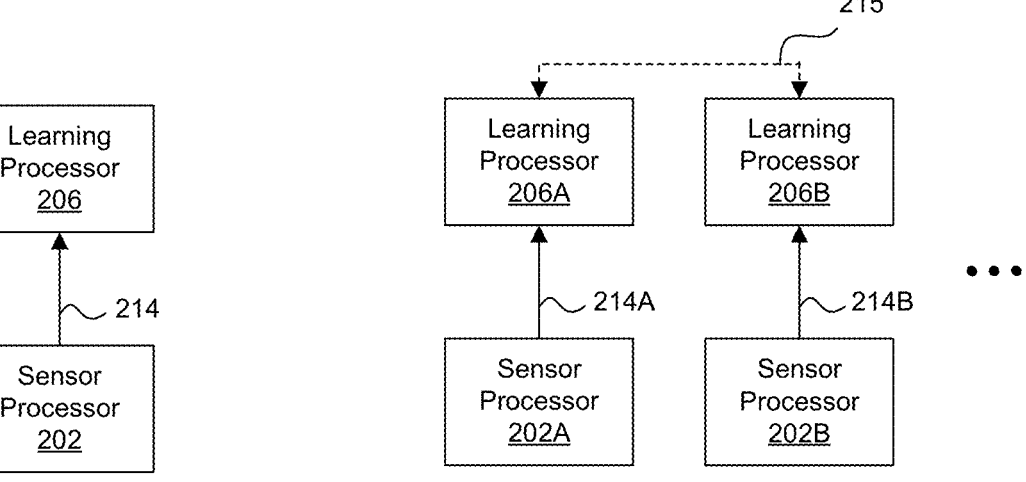
FIG. 3A          FIG. 3B
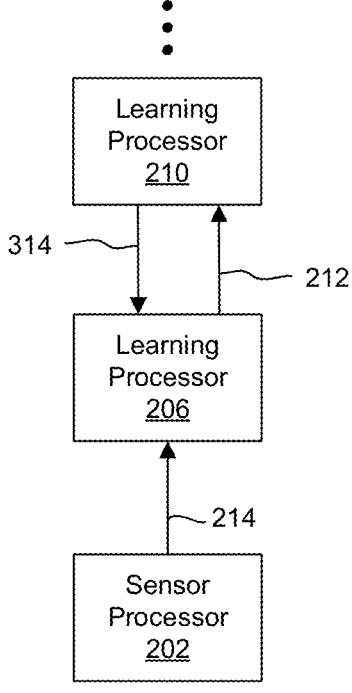
FIG. 3C

246A

Agent
410A

Actuator
222A

Sensor
420A

Sensor
420B

Sensor
420C

246B

Agent
410B

Actuator
222B

Sensor
420D 552    530

Learning Processor
500

536    540

Input Pose
Converter
510

548

Vote
Converter
518

224I

526

Interface
502

538

Inference Generator
514

564

544

562

2240

Model Builder
558

Model Storage
520

532

Goal State
Generator
528

524I    5240

CCP Message 0

CCP Message 1

CCP Message (N-1)

CCP Signal
600

614

652

CCP Message

| Pose 618 | Object Info 622 | Conf 626 | Use State 630 | Sender Info 634 | Optional Info 648 | |

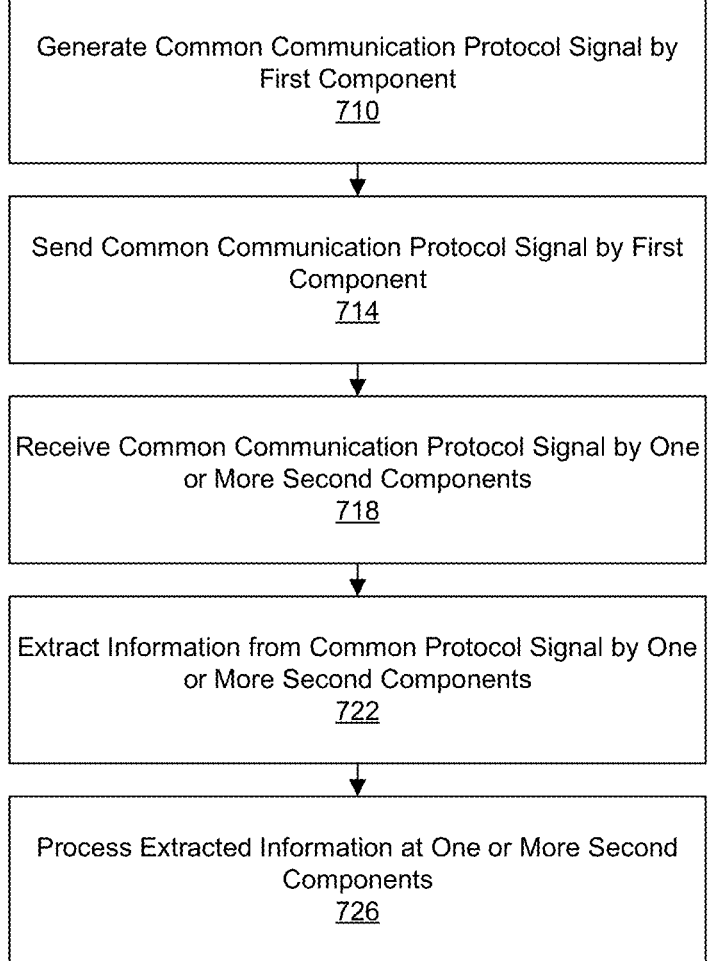

Generate Common Communication Protocol Signal by
First Component
710

Send Common Communication Protocol Signal by First
Component
714

Receive Common Communication Protocol Signal by One
or More Second Components
718

Extract Information from Common Protocol Signal by One
or More Second Components
722

Process Extracted Information at One or More Second
Components
726

FIG. 7

COMMUNICATION PROTOCOL FOR INFERENCE SYSTEM

CROSS-REFERENCE TO RELATED APPLICATIONS

This application claims priority to U.S. Provisional Patent Application No. 63/508,898, filed on Jun. 18, 2023, and U.S. Provisional Patent Application No. 63/516,845, filed on Jul. 31, 2023, which are incorporated by reference herein in their entirety.

BACKGROUND

1. Field of the Disclosure

The present disclosure relates to a communication protocol for exchanging information between components in an inference system that makes inferences, makes predictions or creates content.

2. Description of the Related Arts

Inference systems have a variety of applications including object detection. Object detection systems aim to find or recognize different types of objects present in input data. The input data for object detection may be in the form of image data, video data, tactile data, or other types of sensor data. For example, an object detection system may recognize different objects, such as a coffee cup, a door, and the like, included in visual images that are captured by a camera or sensed by tactile sensors.

Conventional object detection systems face many challenges. One of such challenges is that the same object may be placed in different locations and/or orientations. The change in the locations and/or orientations of the objects from the originally learned locations and/or orientations may cause the conventional object detection systems to recognize the same object as different objects. Existing object detection models, such as convolutional neural network models (CNN), are not always sufficient to address the changes in the locations and/or orientations, and often require significant amounts of training data even if they do address such changes.

Moreover, regardless of the types of sensors, the input data including a representation of an object has spatial features that would distinguish it from a representation of another object. The absence of spatially distinctive features may give rise to ambiguity as to the object being recognized. Conventional object detection systems do not adequately address such ambiguity in the objects being recognized.

SUMMARY

Embodiments relate to performing inference or prediction or generating content by communicating signals between processors of an inference system where each of the signals complies with a common communication protocol that includes pose information and object information. The object information may identify one or more features of an object or identify an object itself. The pose may indicate a location and an orientation of the object or a feature of the object. By using the signals that comply with the common communication protocol, the inference system may operate regardless of differences in the organization and/or number of its components and modalities of sensors for providing sensory input to the inference system.

BRIEF DESCRIPTION OF THE DRAWINGS

The teachings of the embodiments can be readily understood by considering the following detailed description in conjunction with the accompanying drawings.

FIGS. 3A through 3C are diagrams illustrating inference systems with components organized in different architectures and arrangements, according to embodiments.

FIG. 7 is a flowchart illustrating the generation and use of the CCP signal, according to one embodiment.

DETAILED DESCRIPTION OF EMBODIMENTS

Figure 1:
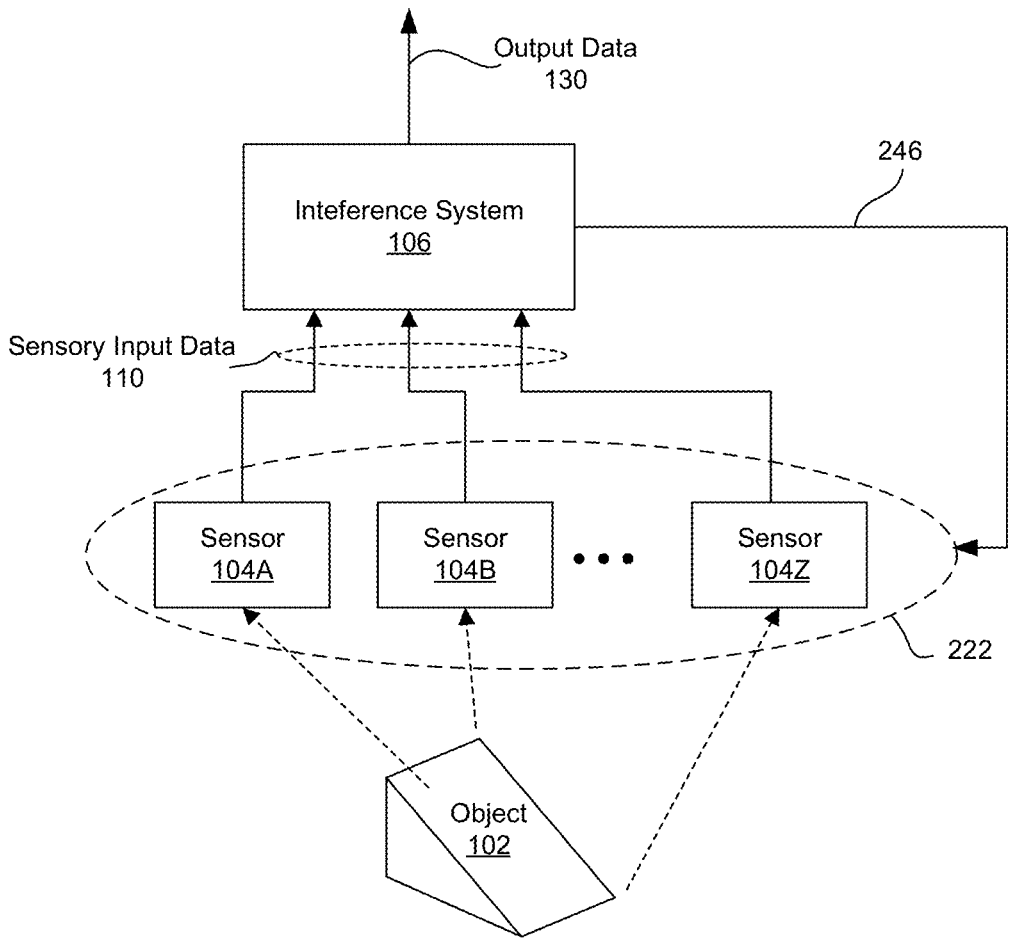
FIG. 1 is a conceptual diagram of an inference system, according to one embodiment.

In the following description of embodiments, numerous specific details are set forth in order to provide a more thorough understanding. However, the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The language used in the specification has been principally selected for readability and instructional purposes, and may not have been selected to delineate or circumscribe the inventive subject matter. Accordingly, the disclosure set forth herein is intended to be illustrative, but not limiting, of the scope.

Embodiments relate to a common communication protocol (CCP) used across different processors of an inference system that recognizes an object and its state, or affects changes in the state of the object to a targeted state, based on sensory input. One or more processors may convert the information they generate into a format compliant with the CCP for sending to one or more other components. The CCP includes pose information and object information of an object. The pose information indicates the location and the orientation of the object in a common coordinate system, as detected, inferred, predicted or targeted by a processor of the inference system. The object information indicates either (i) one or more features of the object, as detected, predicted or targeted, or (ii) identification of the object, as inferred or predicted by the processor of the inference system. The common communication protocol enables the inference system to operate despite structuring or organizing of its processors into diverse architectures. Further, the common communication protocol facilitates or enables the implementation of an inference system that interacts with real-world objects or their virtual counterparts.

A location described herein refers to a coordinate of an object relative to a common coordinate system. The common coordinate system may be set relative to a body of a robotic system that includes sensors. Each sensor may have its local coordinate system that may be converted into the common coordinate system.

A feature of an object described herein refers to a property associated with a part of the object or the entire object. The same feature may be shared across multiple objects or parts of the same object. The features of an object may include, among others, shapes (e.g., a flat surface or a sharp edge), colors, textures (e.g., smooth or rough), materials, sizes, weights, patterns, transparency and functionalities (e.g., presence of moveable parts).

A state of an object described herein refers to a characteristic of the object that may be changed. The state may include, among others, a location and an orientation of the object and a mode if the object may be placed in one or more of different modes (e.g., a stapler as an object that may be in a closed mode or an open mode). The state may also include other characteristics of the object such as velocity, pressure, dimensions, weight, traffic congestion state, operating status and health status.

High-Level Overview of Inference System

FIG. 1 is a conceptual diagram of an inference system 106, according to one embodiment. Inference system 106 performs inference based on sensory input data 110 received from one or more sensors 104A through 104Z (collectively hereinafter referred to as "sensors 104" or individually as "sensor 104") that move along with associated agents, which makes relative movement against object 102. The movement of the agents may be caused by one or more actuators 222 that operate by control signals 246 generated by inference system 106. Sensors 104 may be moved individually or collectively as a set, as described below in detail with reference to FIG. 4.

Inference system 106 may perform various types of inference operations on objects and generate inference output data 130. For example, Inference system 106 may receive sensory input data 110 corresponding to sensors at different locations on object 102, and perform object recognition based on the received sensory input data 110. As another example, inference system 106 can predict sensory input data 110 at a particular part of object 102. Inference output data 130 indicates the result of inference, prediction on identity or construction of object 102 or objects, or generation of content (e.g., images, texts, videos or sounds), as performed by the inference system 106. As a further example, inference system 106 may generate content such as images, texts, sounds or videos as the result of its operation based on sensory input data 110 representing one or more of texts, videos, images and sounds or any other types of information.

Although embodiments are described below primarily with respect to recognizing an object and/or its state based on sensory input data 110, inference system 106 may be used in other applications using different types of sensory input data. For example, inference system 106 may receive sensory input data from online probes that navigate and measure traffic in different parts of a network and determine whether the network is in a congested or anomalous state, predict or estimate the performance of financial instruments, determine whether communication signals are benign or malign to authenticate a person or entity, determine states of machines or processes, diagnose ailments of patients, detect pedestrian or objects for autonomous vehicle navigation, control a robot to manipulate objects in its environment, and generate contents such as texts, images, sounds and videos.

Sensory input data 110 may include, among others, images, videos, audio signals, sensor signals (e.g., tactile sensor signals), data related to network traffic, financial transaction data, communication signals (e.g., emails, text messages and instant messages), documents, insurance records, biometric information, parameters for manufacturing process (e.g., semiconductor fabrication parameters), inventory patterns, energy or power usage patterns, data representing genes, results of scientific experiments or parameters associated with operation of a machine (e.g., vehicle operation), medical treatment data, content such as texts, images sounds or videos, and locations of a subunit of content (e.g., token, pixels, frame) within the contents. The underlying representation (e.g., photo and audio) can be stored in a non-transitory storage medium. In the following, the embodiments are described primarily with reference to a set of tactile sensors on a robotic hand or an image sensor, merely to facilitate explanation and understanding of inference system 106.

Features detected by processing sensor input data 110 may include, among others, a geometry of a shape, texture, curvature, color, brightness, semantic content, intensity, chemical properties, and abstract values such as network traffic, stock prices, or dates.

Inference system 106 may process sensory input data 110 to produce an output data 130 representing, among others, identification of objects, identification of recognized gestures, classification of digital images as pornographic or non-pornographic, identification of email messages as unsolicited bulk email ("spam") or legitimate email ("non-spam"), identification of a speaker in an audio recording, classification of loan applicants as good or bad credit risks, identification of network traffic as malicious or benign, identity of a person appearing in the image, natural language processing, weather forecast results, patterns of a person's behavior, control signals for machines (e.g., automatic vehicle navigation), gene expression and protein interactions, analytic information on access to resources on a network, parameters for optimizing a manufacturing process, identification of anomalous patterns in insurance records, prediction on results of experiments, indication of illness that a person is likely to experience, selection of contents that may be of interest to a user, indication on prediction of a person's behavior (e.g., ticket purchase, no-show behavior), prediction on election, prediction/detection of adverse events, a string of texts in the image, indication representing topic in text, a summary of text or prediction on reaction to medical treatments, content such as text, images, videos, sound or information of other modality, and control signals for operating actuators (e.g., motors) to achieve certain objectives. In the following, the embodiments are described primarily with reference to the inference system that recognizes objects to facilitate explanation and understanding of inference system 106.

Inference system 106 further generates control signals 246 that are fed to one or more actuators 222 that control agents associated with sensors 104. Control signals 246 indicate the movement to be made by the agents, and may indicate, for example, rotation, linear movement, zooming, and a change of modes of sensors 104.

Figure 2:
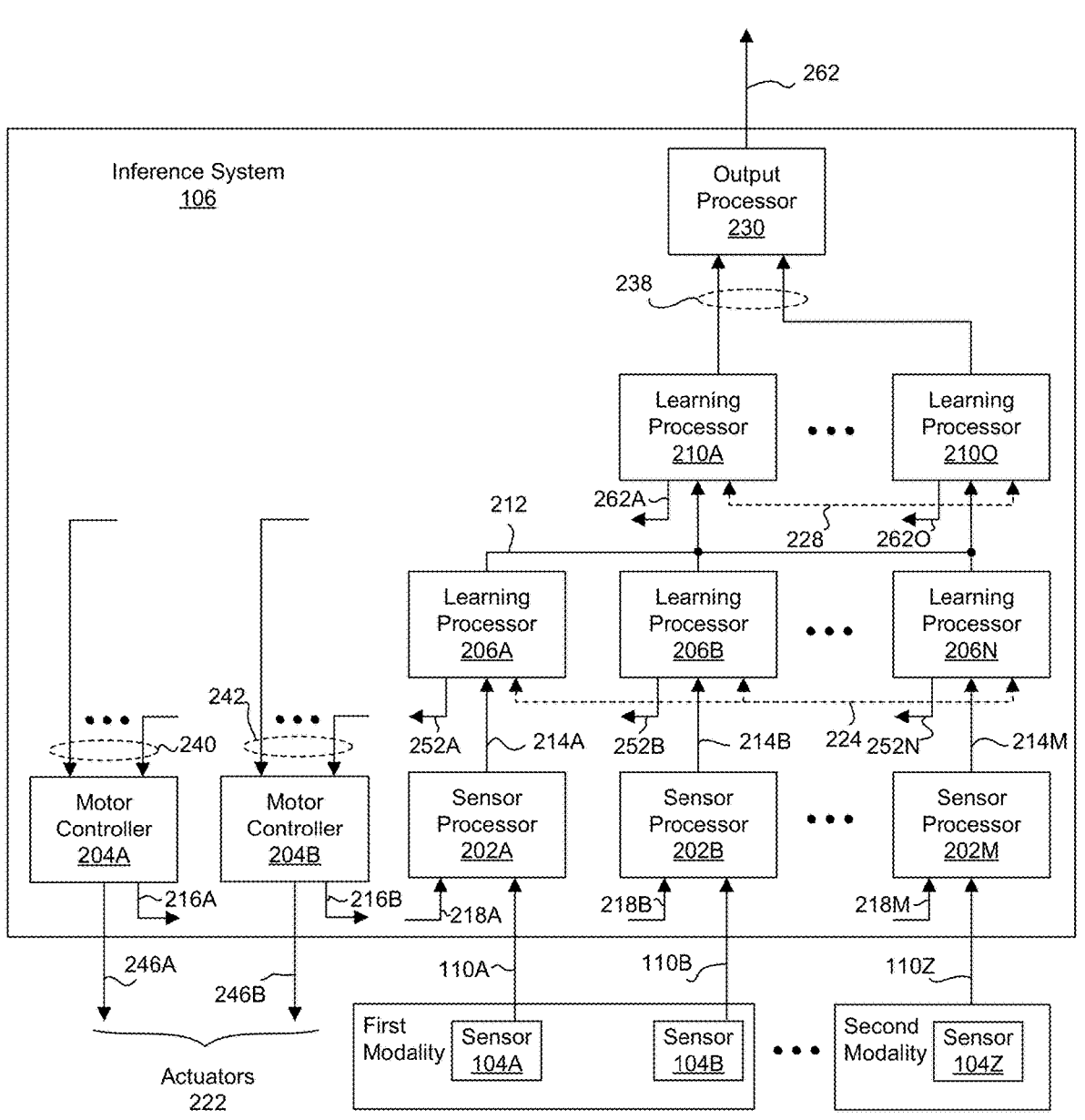
FIG. 2 is a block diagram illustrating components of the inference system, according to one embodiment.

FIG. 2 is a block diagram illustrating components of inference system 106, according to one embodiment. Inference system 106 in FIG. 2 is an example of a hierarchically structured system that includes components such as sensor processors 202A through 202M (collectively referred to hereinafter as "sensor processors 202" and individually also as "sensor processor 202"), a lower level learning processors 206A through 206N (collectively referred to hereinafter as "learning processors 206" or also individually as "learning processor 206"), a higher level learning processors 210A through 2100 (collectively referred to hereinafter as "learning processors 210" and also individually as "learning processor 210"), motor controllers 204A, 204B (collectively referred to hereinafter as "motor controllers 204" and also individually as "motor controller 204"), and an output processor 230.

The structure and organization of components in FIG. 2 are merely illustrative, and these components may be organized into various architectures, and other functional processors or controllers may also be employed. FIGS. 3A through 3C are diagrams illustrating learning processors and sensor processors organized into various architectures, according to different embodiments.

FIG. 3A illustrates an inference system having sensor processor 202 and learning processor 206 as a set. In this example, sensor processor 202 generates sensor signal 214 which is fed directly to learning processor 206. The structure of FIG. 3A is the basic and simplest architecture of the inference system.

FIG. 3B illustrates an inference system having multiple sets of sensor processors 202A, 202B and learning processors 206A, 206B. In each set, sensor signals 214A, 214B are sent from sensor processors 202A, 202B to learning processors 206A, 206B. Each pair of sensor processor and learning processor may be associated with different sensors of the same modality or sensors of different modalities. By sharing lateral voting signals 215 among the learning processors 206A, 206B, a more robust and faster inferencing may be performed by the inference system. A lateral voting signal from a learning processor (e.g., learning processor 206A) indicates the likely poses (e.g., locations and orientations) and likely identity of an object associated with the sensory input, as inferred or predicted by the learning processor. Another learning processor (e.g., learning processor 206B) receiving the lateral voting signal may take into account the lateral voting information from the sending learning processor (e.g., learning processor 206A) and update its inference or prediction of the likely poses and likely identities of objects, or generate content corresponding to sensory input data 110.

FIG. 3C illustrates an inference system with multiple learning processors 206, 210 stacked hierarchically with sensor processor 202 feeding sensor signals 214 to learning processor 206. By stacking learning processors 206, 210 and providing an inference output 212 from learning processor 206 at a lower level to learning processors 210 at a higher level, a more abstract, complex and stable modeling of objects may be generated and used by the inference system. In one or more embodiments, the learning processor at the higher level may learn, predict, infer or create compositionality of an object or objects. For example, learning processor 206 at a lower level may make an inference or prediction on a single object whereas learning processor 210 at a higher level may make an inference or prediction on poses and identities of multiple objects based on inference output 212 from learning processor 206. For example, learning processor 206 may make inferences or predictions on poses of individual objects on a table while the learning processor 210 may make an inference or a prediction on all the objects on the table and their spatial relationships. Further, learning processor 210 at a higher level may also make a quicker inference or prediction based on the inference output 212 compared to learning processor 206. The inference system may include one or more levels of learning processors depending on its application.

As shown in FIG. 3C, learning processor 210 at a higher hierarchical level may send downstream signal 314 to learning processor 206 at a lower hierarchical level. Downstream signal 314 may be a version of inference output generated at learning processor 210 and may indicate higher-level information or a larger context relative to output 212 from learning processor 206. For example, downstream signal 314 may indicate a high-level object (e.g., a car) whereas inference output 212 may indicate a low-level object (e.g., a wheel) that is part of the high-level object. Downstream signal 314 may bias the inference operations at learning processor 206 so that subsequent inference operations are consistent with the inference at learning processor 210.

The architectures of inference systems described above with reference to FIGS. 2 through 3C are not exhaustive. Various other combinations or expansions of inference systems may be implemented.

Embodiments provide a common protocol that may be used by components of the inference systems of different architectures to communicate information. In one or more embodiments, the components of the inference systems communicate signals complying with the CCP enable the components of the inference systems to be wired differently, expanded or compressed depending on their applications and performance needs.

Example Sensor Signal Processing

Returning to FIG. 2, sensors 104 generate sensory input data 110 provided to inference system 106. Sensory input data 110 indicates one or more physical properties associated with corresponding features at a part of an object or an entire object. Sensors 104 may be of different modalities. For example, sensors 104A, 104B may be of a first modality (e.g., touch sensing) while sensor 104Z may be of a second modality (e.g., image sensing). Inference system 106 is capable of processing sensory input data 110 generated by sensors 104 of different modalities. Although only two modalities of sensors are illustrated in FIG. 2, sensors of many more modalities may provide sensory input data 110 to inference system 106.

Sensor processors 202 are hardware, software, firmware or a combination thereof for generating sensor signals 214A through 214M (hereinafter collectively referred to as "sensor signals 214" or also individually as "sensor signal 214") for performing inference, prediction or content generation at inference system 106. Specifically, each of the sensor processors 202 processes sensory input data 110A through 110Z (collectively corresponding to sensor input data 110 of FIG. 1) and generates corresponding sensor signal 214 compliant with the CCP. A sensor signal 214 includes information on a converted pose of a part of the object and one or more features associated with the part of the object.

Motor information 216A, 216B from motor controllers 204A, 204B includes information from which the raw poses (e.g., the locations and orientations) of agents (attached with one or more sensors 104) may be derived. Each of sensor processors 202 receives all or part of motor information 216 as raw pose 218 from motor controllers 204.

Alternatively, each of sensor processors 202 receives information from which a raw pose may be derived. Such information may include, but not limited to, proprioceptive information generated by accelerometers, gyrocopes, encoders or force sensors associated with actuators or optical flow representing movement of pixels in a sequence of images captures by a visual sensor, The raw pose may be represented in terms of a local coordinate system specific to the sensor or an agent associated with the sensor. Sensor processor 202 stores mapping between the local coordinate systems specific to the sensors and the common coordinate system. Using such mapping, sensor processor 202 may convert a raw pose expressed in terms of the sensor-specific coordinate system into a converted pose expressed in terms of a coordinate system common throughout learning processors 206, 210. Alternatively or in addition, the raw pose or information associated with the raw pose may be generated and sent to sensor processor 202 from the corresponding sensor or other sensors.

Sensor processor 202 assigns a unique feature identifier (ID) to each of the features, and identifies the detected features corresponding to sensory input data 110. For example, a sharp edge may be identified as feature 1, a flat surface may be identified as feature 2, etc. If multiple features (e.g., a sharp edge and green color) are detected at a pose of a part of the object, sensor processor 202 may include multiple feature identifiers in sensor signal 214. The unique IDs of the features may be stored in sensor processor 202 so that the same feature is identified with the same ID when detected at different times. The same feature may be identified by comparing sensory input data 110 or its part with information on the features, and determining one or more stored features that are similar, based on a method, to sensory input data 110 or its part. In one or more embodiments, the feature ID is assigned so that similar features IDs are associated with similar features. The similarity of the features and sensory input data 110 or its part may be determined using various methods including, but not limited to, Hamming distance, Euclidean distance, and Cosine difference and Mahalanobis distance. The feature IDs may be in the format such as decimals or sparse distributed representations (SDRs). Sensor signal 214 generated by sensor processor 202 complies with the CCP, as described below in detail with reference to FIG. 6B.

Although not illustrated in FIG. 2, some of the sensor processors 202 may receive the same sensory input data 110 from the same sensor 104. Different sensor processors 202 may extract and process different aspects of the same sensory input data 110, and generate different sensory input data 110.

Example Operations of Learning Processor

Learning processors 206, 210 are hardware, software, firmware or a combination thereof that makes predictions or inferences on the object and/or create content, according to various information it receives. Information used by a learning processor may include, among others, sensor signal 214 from sensor processor 202 or inference output 212 received from another learning processor at a lower level, and lateral voting signal 224, 228 received from other learning processors at the same level or different levels of hierarchy. Alternatively or in addition, a learning processor may use downstream signals from other learning processors at a higher hierarchy. The information received by learning processors 206, 210 complies with the CCP, as described below in detail with reference to FIG. 6B.

In one or more embodiments, each of the learning processors develops its own models of objects during its learning phase. Such learning may be performed in an unsupervised manner or in a supervised manner based on information that each of the learning processors has accumulated. The models developed by each of the learning processors may differ due to the differences in sensor signals that each learning processor has received for learning and/or parameters associated with its algorithms. Different learning processors may retain different models of objects but share their inference, prediction or created content with other learning processors in the form of inference output 212 and/or lateral voting signals 224, 228. In this way, each of the learning processors makes inference, prediction or content generation using its own models while taking into account inference, prediction or content made by other learning processors.

Learning processors may be organized into a flat architecture or a multi-layered hierarchical architecture. FIG. 2 illustrates a hierarchical architecture where learning processors 206 are at a lower level and learning processors 210 are at a higher level of the hierarchy. Learning processors 206 receive sensor signal 214 from sensor processor 202, while learning processors 210 receive inference output 212 from learning processors 206 at a lower level. Because inference output 212 tends to remain constant over a longer time, learning processors 210 generate inference outputs 238 that are more time-invariant and stable relative to inference outputs 212 generated by learning processors 206. Moreover, in scenarios where each of learning processors 210 receives inference output 212 from multiple learning processors 206, inference output 238 generated by learning processors 210 represents more abstract or higher-level information of an object/objects or a larger context associated with the object/objects than inference outputs 212.

Output processor 230 is hardware, software, firmware or a combination thereof that receives inference output 238 and generates system output 262 indicating the overall inference, prediction or content generation as a result of processing at inference system 106. System output 262 may correspond to inference output data 130 of FIG. 1. System output 262 may indicate the highest likely object/objects and/or their poses, as inferred or predicted by inference system 106. Alternatively, system output 262 may indicate various likely object/objects or their poses along with their confidence values. In other embodiments, output processor 230 may merely concatenate inference output 238 from different learning processors 210 into system output 262. The inference output

238 may also include information from other learning processors 210 such as inference outputs 212 from learning processors 206 or sensor signals 214 from sensor processors 202. In yet other embodiments, output processor 230 may be omitted, and control signals from motor controllers 204 may be provided as an output of inference system 106.

Although FIG. 2 shows sensor signals 214 being fed only to lower learning processors 206, in other embodiments, sensor signals 214 may be provided also to higher learning processors 210 and/or output processor 230. Further, all or a subset of inference outputs 212 from lower learning processors 206 may also be provided to the output processor 230.

Example Actuator Control

Motor controllers 204A, 204B are hardware, software, firmware or a combination thereof for generating control signals 246A, 246B (collectively referred to also as "control signals 246") to operate actuators 222A, 222B (collectively referred to as "actuators 222"). Motor controllers 204 receive control inputs 240, 242, each of which corresponds to all or a subset of action outputs 252A through 252M and 262A through 2620 generated by learning processors 206, 210. An action output from a learning processor may indicate a targeted pose of actuators 222. The targeted pose may be a pose that is likely to produce sensory input data 110 that resolves ambiguity or increases the accuracy of the inference, prediction or creation made by the learning processor. Alternatively, the targeted pose may be a pose that indicates how the actuators should be operated to manipulate the environment in a desired manner. The action output may be translated into individual motor commands for operating individual actuators 222. In one or more embodiments, the action outputs from different learning processors may conflict. In such case, motor controllers 204 may implement a policy to prioritize, select or blend different action outputs from the learning processors to generate control signals 246 that operate actuators 222.

Figures 4, 5:
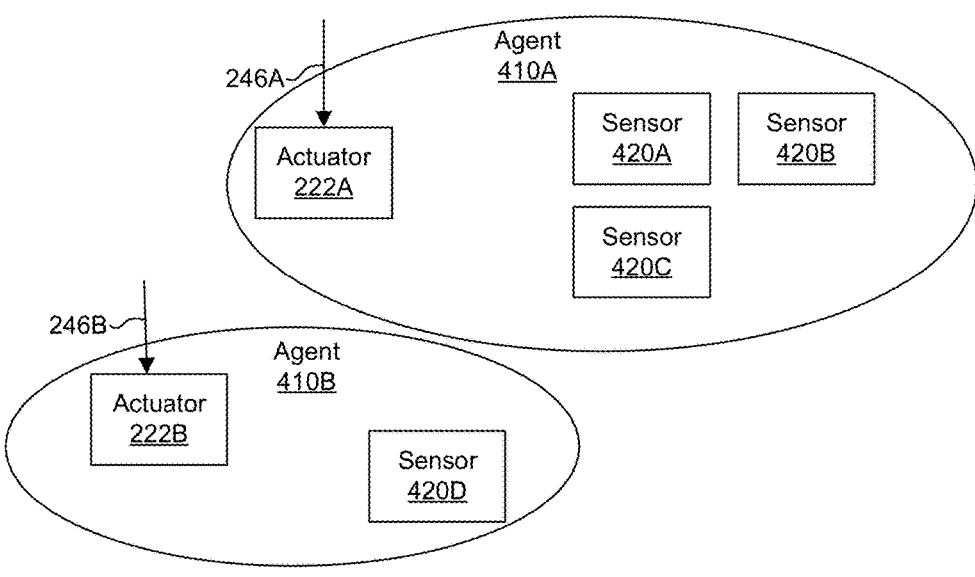
FIG. 4 is a conceptual diagram illustrating agents associated with sensors, according to one embodiment.
FIG. 5 is a block diagram illustrating a learning processor in the inference system, according to one embodiment.

FIG. 4 is a conceptual diagram illustrating agents 410A, 410B, each including actuator 222A, 222B, according to one embodiment. An agent is a physical or logical construct that may be manipulated to cause changes in sensory input data from one or more associated sensors. The changes in the sensory input data, for example, may relate to the coverage of sensory input data, specificity or fidelity of sensory input data, and/or contents of the sensory input data. Taking an example of tactile sensors, these tactile sensors may be fixed onto a finger of a robotic hand that functions as an agent including an actuator to move the finger. Another example is of a camera as the sensor where the camera may be mounted onto a gimbal functioning as an agent including actuators (e.g., motors) in the gimbal.

Inference system 106 may operate with multiple agents associated with different sensors. As shown in FIG. 4, for example, sensors 420A through 420C are associated with agent 410A while sensor 420D is associated with agent 410B. Agent 410A includes actuator 222A that receives control signal 246A from motor controller 204A. Since sensors 420A through 420C are all associated with agent 410A, these sensors may all be manipulated collectively as a set in the same manner by actuator 222A. On the other hand, agent 410B includes actuator 222B that receives control signal 246B from motor controller 204B. Since only sensor 420D is associated with agent 410B, only sensor 420D is manipulated by actuator 222B. In one or more embodiments, a plurality of agents may be organized hierarchically so that an operation of actuators in an agent of a higher hierarchy does not affect another agent at a higher hierarchy while the operation of actuators of an agent at a lower hierarchy affects the agent at a higher hierarchy. Taking an example of a humanoid robot, the movement of a body as a lower agent and a head of the robot as another agent, the movement of the head does not affect changes in the pose of the humanoid robot's body but the movement of the humanoid's body affects changes in the pose of the head.

Motor controllers 204 also generate motor information 216 that enables sensor processors 202 to determine the raw pose of the agent, and thereby determine the raw poses of sensors associated with the agent. In one embodiment, motor information 216 indicates displacements of actuators relative to a previous time step. In other embodiments, motor information 216 indicates poses (e.g., rotation angles or linear locations) of actuators controlled by motor controllers 204.

Although only a single actuator is illustrated in FIG. 4 as being associated with agent 410A or 410B, more than one actuator may be included in agent 410A or 410B to adjust the poses of agent 410A or 410B with various degrees of freedom. In such case, respective motor controller 204 may generate and send control signals to multiple actuators associated with an agent. Further, although only two agents are illustrated in FIG. 4, many more agents may be provided. The sensors associated with the same agent may be of the same modality or different modalities.

Example Structure of Learning Processor

FIG. 5 is a block diagram illustrating learning processor 500 in inference system 106, according to one embodiment. Learning processor 500 may be, for example, learning processor 206 or learning processor 210 in FIG. 2. Learning processor 500 receives a sequence of input signal 526 over time, generates a representation of the received sequence of input signal 526, and performs inference, prediction or creation of contents using models it stores. If learning processor 500 determines that input signal 526 does not correspond to any of the models it stores, learning processor 500 may generate a new model and use the new model in subsequent inference, prediction or creation. Such generation of new models may be performed in an unsupervised manner or in a supervised manner.

Learning processor 500 may be embodied as software, hardware or a combination thereof. Learning processor 500 may include, among other components, interface 502, an input pose converter 510, an inference generator 514, a vote converter 518, a model builder 558, a model storage 520 and a goal state generator 528. Learning processor 500 may include other components not illustrated in FIG. 5. Also, some of the components illustrated in FIG. 5 may be combined into a single component. Further, one or more of these components may be embodied as dedicated hardware circuitry.

Interface 502 is hardware, software, firmware or a combination thereof for controlling receipt of input signal 526 and extracting relevant information from input signal 526 for further processing. Input signal 526 may be a sensor signal from a sensor processor, an inference output from another learning processor or a combination thereof. In one or more embodiments, interface 502 stores input signals 526 received within a time period (e.g., a predetermined number of recently received input signals 526), extracts object information 538 (e.g., detected feature IDs or object IDs) and a current pose 536 of a part or point of an object. Interface 502 may also provide sensory information 532 to goal state generator 528 to assist goal state generator 528 generate target state 5240. In one or more embodiments, interface 502 may store current poses 536 and object information 538.

Input pose converter 510 is hardware, software, firmware or a combination thereof for determining displacement 540 of current pose 536 of a part or point of an object associated with object information 538 in the current time step relative to a previous pose of a part or point of the object associated with object information 538 in a prior time step. For this purpose, input pose converter 510 includes a buffer to store the previous pose. Alternatively, input pose converter 510 may access interface 502 to retrieve the previous pose of a part or point of an object.

Model storage 520 stores models of objects and other related information (e.g., a configuration of the environment in which the objects are placed). The stored model may be referenced by inference generator 514 to formulate hypotheses on the current object, its pose, its state and/or its environment, and assess the likelihood of these hypotheses. The stored model may be used by the goal state generator 528 to generate the target states. New models may also be generated by model builder 558 for storing in model storage 520.

Inference generator 514 is hardware, software, firmware or a combination thereof for initializing and updating hypotheses on object/objects, their poses and/or their states according to object information 538 and displacement 540. For this purpose, inference generator 514 references models stored in model storage 520 and determines which of the models are likely based on object information 538 and displacement 540.

Inference generator 514 may also receive further information from other components of intelligent system 106 to make inferences or predictions. For example, inference generator 514 may receive a converted version 548 of lateral vote signal 2241 from other learning processors at the same hierarchical level as learning processor 500 via vote converter 518. Inference generator 514 may also receive downstream signal 552 from a learning processor at a higher hierarchical level than that of learning processor 500. Downstream signal 552, for example, corresponds to downstream signal 314 in FIG. 3. These signals external to learning processor 500 may be used to update the likelihood of the hypotheses or restrict/constrain the hypotheses to be considered. The likelihood may be represented by evidence values corresponding to accumulated evidence or probabilities on the hypotheses.

After hypotheses on the objects/environment are formulated using one or more of current poses 536, object information 538, converted version 548 of lateral vote signal and downstream signal 552 the hypotheses are converted into inference signal 530 and/or lateral vote signal 2240 for sending out to other components of intelligent system 106.

As part of its operation, inference generator 514 determines whether current poses 536 and object information 538 correspond to models stored in model storage 520. If current poses 536 and object information 538 match only one model in model storage 520 and the evidence value associated with that model exceeds a threshold, inference generator 514 sends match information 564 to model builder 558 instructing model builder 558 to update the matching model. If more than one model matches current poses 536 and object information 538 received up to that point or the evidence value of the model does not exceed the threshold, match information 564 is not sent to model builder 558. In contrast, if current poses 536 and object information 538 do not match any of the models in model storage 520, inference generator

514 sends match information 564 to model builder 558 instructing model builder 558 to add a new model corresponding to object information 538 and current poses 536.

Inference generator 514 generates inference signal 530 and lateral vote signal 2240 based on its inference or prediction. Inference signal 530 is sent to a learning processor at a higher hierarchical level or to output processor 230 while lateral vote signal 2240 is sent to other learning processors at the same level as learning processor 500 or different levels from that of learning processor 500.

Vote converter 518 is hardware, software, firmware or a combination thereof for converting the coordinates of poses indicated in lateral vote signal 2241 into a converted pose that is consistent with the coordinate systems of the models in model storage 520. Each learning processor in intelligent system 106 may generate and store the same model in different poses and/or states. For example, a learning processor may store a model of a mug with a handle of the mug oriented in the x-direction while another processor may store the same model with the handle oriented in the y-direction. To enable learning processor 500 to account for such differences in stored poses or coordinate system of the models and/or their states, vote converter 518 converts the coordinates of features indicated in lateral vote signal 2241 so that the converted coordinates are consistent with those of the models stored in model storage 520. Additionally, vote converter 518 accounts for spatial offsets of parts of the same object detected by other learning processors that send incoming lateral vote signal 2241. For example, one learning processor may receive sensory information on a handle of a mug, and therefore, generates a hypothesis that its location is on the handle, while another learning processor may receive sensory input from the rim of the same mug. Because of displacements between the features associated with sensor signals fed to different learning processors and resulting difference in hypotheses being generated or updated by different learning processors, vote converter 518 may convert the poses or coordinates as indicated in lateral vote signal 2241 in a different manner for each model and/or its state.

Although not illustrated in FIG. 5, a downstream converter may also be provided in learning processor 500 to convert downstream signal 552 from an upper-level learning processor so that any object information in downstream signal 552 is represented in the same pose and/or coordinate system as the models stored in model storage 520.

Model builder 558 is hardware, software or a combination thereof for generating models or updating models. After model builder 558 receives match information 564 from inference generator 514, model builder 558 may generate new model 562 and store it in model storage 520 or update a model stored in model storage 520. Match information 564 indicates whether a sequence of input signals 526 are likely to match a model stored in model storage 520 and the likely pose of the object.

Goal state generator 528 is hardware, software or a combination thereof for determining target states of agents that, when executed by actuators, would resolve ambiguities and thereby enable more accurate determination of the current object or detect different aspects of a new model to better learn the new object. The goal state generator 528 may also be used beyond learning, prediction and inference. For instance, the target state 5240 of goal state generator 528 may be used to manipulate objects, place the environment in a certain state, communicate or generate content. For these purposes, goal state generator 528 receives match information 544 from inference generator 514 and sensory information 532 from interface 502. Match information 544 indicates a list of models or their states that are likely to correspond to the current sensations included in input signal 526. Goal state generator 528 executes a set of logic embodying a policy to generate target state 5240 of the agents that is likely to resolve or reduce any ambiguity or uncertainty associated with multiple candidate objects or detect new features in the new object being learned. For example, if inference generator 514 determines that the current object is either a sphere or a cylinder, goal state generator 528 may determine the target state of an agent associated with a tactile sensor to be placed at either an upper end or a lower end of the current object. Depending on whether a rim is detected, the current object may be determined to be a sphere or a cylinder.

To generate its target state 5240, goal state generator 528 may also receive incoming target state 524I from other components of intelligent system 106 and sensory information 532 from interface 502. Sensory information 532 may indicate, among others, (i) success/failure of prior attempts of target states, and (ii) previous poses. Goal state generator 528 may take into account sensory information 532 so that a target state covers previously unsuccessful target states while avoiding a target state that may be redundant due to prior poses. Goal state generator 528 may also consider the incoming target state 524I and sensory information 532 to generate target state 5240. In one or more embodiments, incoming target state 524I indicates a higher level target state generated by another learning processor (e.g., a learning processor at a higher hierarchical level). The higher level target indicated in target state 524I may be decomposed into target state 5240 indicative of a lower level target state relevant to learning processor 500. In this way, goal state generator 528 may generate target state 5240 which is in line with the higher-level target state. Further, target state 524I may be received from learning processors in the same hierarchical level or a lower hierarchical level so that conflicts with target states of other learning processors may be reduced or be avoided. In this way, the overall accuracy and efficiency of intelligent system 106 may be improved. Target state 5240 may be sent as control inputs 240, 242 to motor controllers 204.

The components of learning processor 500 and their arrangement in FIG. 5 are merely illustrative. Inference system 106 may use learning processors of different architectures and operating algorithms adapted to sensory input data 110 or its application.

Example Common Communication Protocol (CCP)

A CCP signal is used for communicating information between components of inference system 106. In inference system 106, various signals including sensor signals 214, lateral voting signals 224, 228, inference outputs 212, 238, and action outputs 252, 262 (or control inputs 240, 242) are formulated into the CCP signals. Because most, if not all, information transmitted between components of inference system 106 is CCP compliant, inference systems having different architectures of components may be easily developed, expanded, modified or deployed. In some embodiments, the connection between components may be dynamically modified during the operation of the inference system without complications associated with transmitting information between its components.

Figures 6A, 6B:
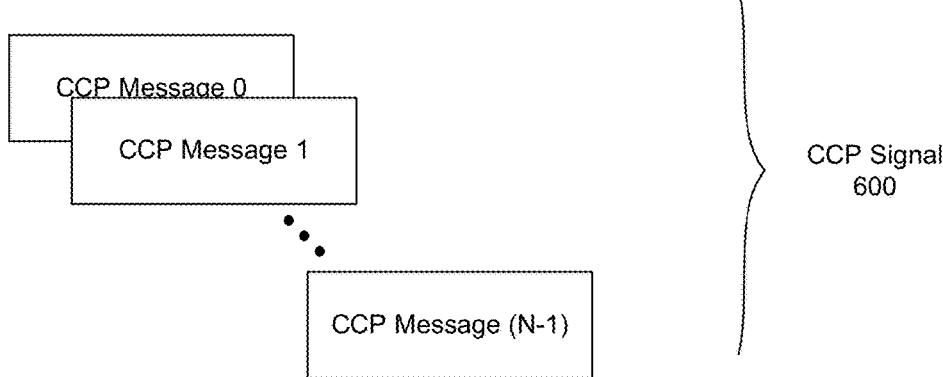
FIG. 6A is a diagram illustrating a common communication protocol (CCP) signal including multiple CCP messages, according to one embodiment.
FIG. 6B is a data structure diagram showing fields of data included in a CCP message, according to one embodiment.

A CCP message may include only one message or multiple messages. FIG. 6A is a diagram illustrating CCP signal 600 including multiple CCP messages 0 through (N−1), according to one embodiment. The number of messages in a CCP message may differ depending on the type of messages as well as object information items sent in a CCP message. In one embodiment, all messages in the same CCP signal 600 are transmitted before a subsequent time step for performing the next inference operation.

FIG. 6B is a data structure diagram showing fields of data included in a message of the CCP signal, according to one embodiment. A CCP message may include, among other data, a start flag 614 indicating the starting of the CCP message, pose data 618 indicating a pose, object information 622, confidence 626 indicating a degree of confidence in pose and object information included in the same CCP message, use information 630 indicating whether the pose and object information should be used for inference, sender information 634 indicating the identity/type of the processor sending the CCP message, optional information 648 that may be custom defined, and an ending flag 652 indicating that the CCP message has concluded. In some embodiments, some of the data fields may be omitted or additional data fields may be added to a CCP message. The additional data fields, for example, indicate a known state or behavior of the object or agents.

Pose data 618 indicates a pose of a part of an object or a pose of an object/objects depending on the types of processors from which the CCP signal originates. For a CCP signal that originates from a sensor processor, the pose data may indicate the location and orientation of a part of the object in a common coordinate system. Conversely, for a CCP signal that originates from a learning processor, the pose data may indicate the location and orientation of a probable object corresponding to sensory input data. In action output 252, 262 (or control input 240, 242), pose data may represent a targeted pose of the sensor in the common reference frame, at which one or more sensors are to detect features in a subsequent time step so that a corresponding learning processor may resolve ambiguity in its inference, prediction or generation.

If the learning processor identifies multiple probable candidate objects or different possible/desired poses of the same object, pose data in each CCP message of the same CCP signal may indicate one or multiple candidate/desired poses of the same object. Pose data 618 may be expressed in various formats. In one or more embodiments, pose data 618 includes a three-dimensional vector and a 3×3 matrix where the three dimensional vector indicates a location defined along x, y, and z axes in a Cartesian coordinate system while the matrix indicates an orientation using angular displacement values. The sensory input data may be of the same or different dimension/size as the pose data 618. The pose does not have to be expressed in 3D space but location and orientation may be expressed in one or two dimension space or space of higher dimensionality.

Object information 622 indicates either object identifiers (IDs), feature identifiers (IDs) or both object IDs and feature IDs. In some cases, object information 622 may include a single object ID or a single feature ID. But in other cases, object information 622 may include multiple object IDs, multiple feature IDs or a combination of object IDs and feature IDs. In sensor signal 214, object information 622 may include multiple feature IDs indicating multiple features detected from the same part of an object. For example, the same part of the object may have multiple features (e.g., color, texture, curvature), and the object information 622 may indicate all the detected features of the same part of the object using corresponding feature IDs. In action output 252, 262 (or control input 240, 242), the object information 622 indicates ID of the object whose pose is to be changed and/or the targeted state of the object.

Confidence 626 indicates the likelihood that pose data 618 and object information 622 included in the same CCP message are correct. In the action output 252, 262 (or control input 240, 242), confidence 626 may indicate the likelihood that the targeted pose may resolve ambiguity, confidence that the inference/prediction/generation of the learning process is accurate, a target confidence that the receiving learning processor should achieve, or confidence may be null and not carry any meaning. If the same confidence value is not applicable across multiple object IDs or feature IDs, multiple CCP messages with respective corresponding confidence values for a subset of object IDs or features IDs may be used. Alternatively, confidence 626 may include multiple confidence values, each corresponding to one of the object/feature IDs in object information 622.

Use information 630 is information indicating whether the pose and the object information are to be used for performing inference or prediction. In one or more embodiments, the sensor processor only sends an updated sensor signal when a difference in features above a threshold is detected by the sensor. In the meantime, the sensor processor continues to send the unchanged sensor signal. In such embodiments, the use information 630 may be set to zero or another value indicating that the replicated sensor signal not be used for inference or prediction while the use information 630 of another value indicates that the updated sensor signal be used for inference or prediction.

Sender information 634 includes information on the type of component sending the CCP message and/or identifier of the component sending the CCP message. The type of component may be a learning processor or sensor processor in the example of FIG. 2. Each of the components in inference system 106 may be assigned with a unique identifier, and the sending component may include its identifier in the CCP message.

Optional information 648 may include additional information that may be used optionally to expand or supplement the operations of the components of inference system 106. For example, optional information 648 may indicate the scale of the object or the feature of the object.

The example structures of the CCP signal and the CCP message described above with reference to FIGS. 6A and 6B are merely illustrative. Various changes or modifications may be made to the structures of the CCP signal and the CCP message. For example, the sequence of data fields in FIG. 6B may be changed, and optional information 648 may be omitted.

A CCP signal may include data other than CCP messages such as the pose (e.g., location and/or orientation) of the sender. The pose of the sender may be used to transform the CCP message content between the senders' and receivers' reference frame. Further, a CCP message may include other data such as displacement information indicating the change of current location or state compared to a prior location or state. The prior location or state may be the location or state detected at a previous time step.

Further, the CCP signal may be used within or outside an inference system as a generic messaging protocol that enables communication between components other than sensor processors, learning processors, motor controllers and output processors. Further, in some embodiments, the CCP signal may be communicated between two or more distinct inference systems.

Method of Using Common Communication Protocol (CCP)

FIG. 7 is a flowchart illustrating a process of generating and processing the CCP signal, according to one embodiment. A first component (e.g., sensor processor 202) of inference system 106 generates 710 a CCP signal (e.g., by processing sensory input data 110 and raw pose 218). The first component may be learning processor 206 that generates inference output 212 and lateral voting signal 224 as CCP signals by processing sensor signal 214 and lateral voting signal 224 received from other learning processors.

The first component then sends 714 the generated CCP signal. The CCP signal may be sent over a generic pathway or a dedicated pathway.

The one or more second components receive 718 the CCP signal over the generic or dedicated pathway. The second components may be learning processors 206, motor controllers 204 or output processor 230.

The one or more second components extract 722 information from the received CCP signal. The CCP signal may include multiple CCP messages. The information from the CCP messages may be extracted and then processed 726 at the one or more second components.

The steps and their sequences illustrated in FIG. 7 are merely illustrative. Additional steps may be added into the sequence, and some steps may be performed in parallel.

Example Computing Device for Implementing Inference System

Figure 8:
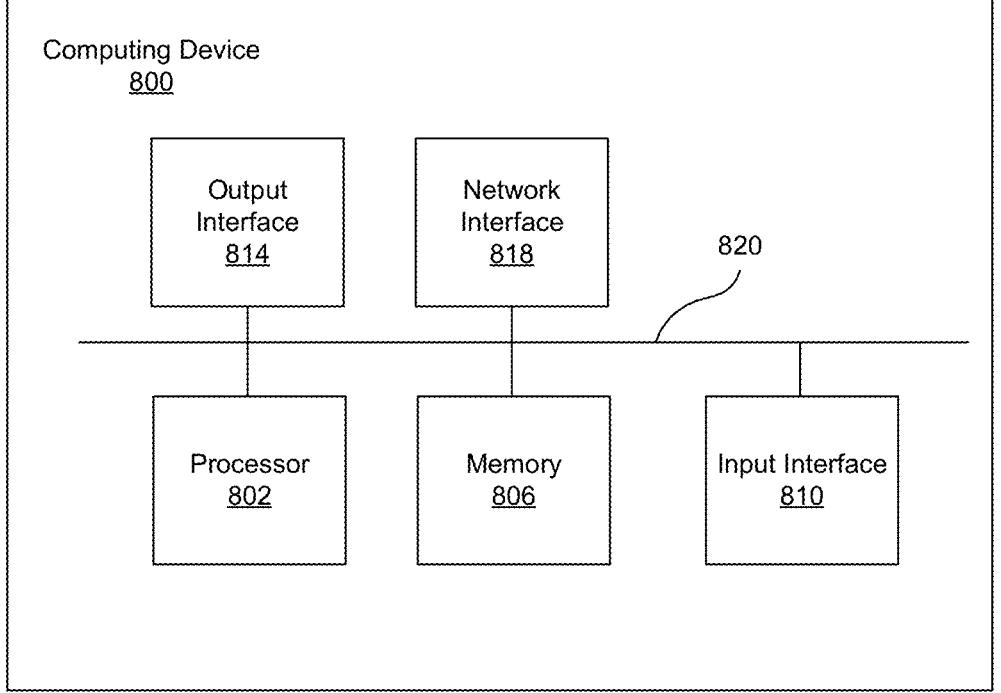
FIG. 8 is a block diagram of a computing device for implementing inference systems, according to embodiments.

FIG. 8 is a block diagram of a computing device 800 for implementing inference systems, according to embodiments. The computing device 800 may include, among other components, a processor 802, a memory 806, an input interface 810, an output interface 814, a network interface 818, and a bus 820 connecting these components. The processor 802 retrieves and executes commands stored in memory 806. The memory 806 stores software components including, for example, operating systems and modules for instantiating and executing nodes as described herein. The input interface 810 receives data from external sources such as sensor data or action information. The output interface 814 is a component for providing the result of computation in various forms (e.g., image or audio signals or motor commands). The network interface 818 enables the computing device 800 to communicate with other computing devices by a network. When multiple processors or components of an inference system are embodied in multiple computing devices, CCP signals may be communicated between computing devices via the network interface 818.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A computer-implemented method of performing inference, comprising:

generating, at a first processor of an inference system, a first signal that complies with a communication protocol that includes a pose of an object or a feature of the object and object information identifying the object or the feature of the object;

sending, by the first processor, the first signal to one or more second processors of the inference system;

extracting, at the one or more second processors of the inference system, the pose and the object information indicated in the first signal; and processing, at the one or more second processors, at least the extracted pose and the extracted object information to perform operations associated with the inference.

2. The method of claim 1, further comprising:

generating, at the one or more second processors, a second signal that complies with the communication protocol in response to processing at least the extracted pose and the extracted object information; and sending the second signal to one or more third processors of the inference system.

3. The method of claim 1, wherein the communication protocol further indicates:

confidence on the pose and the object information being accurate, and sender information indicating a type or identifier of the first signal.

4. The method of claim 3, wherein the communication protocol further indicates whether the pose and the object information are to be used in the operations associated with the inference.

5. The method of claim 1, wherein the first signal includes a plurality of messages, wherein each of the messages complies with the communication protocol and includes a pose of a different feature of the object.

6. The method of claim 1, further comprising:

receiving sensory input from one or more sensors by the first processor;

determining the feature from the received sensory input;

receiving, by the first processor, one or more raw poses of the feature of the object in local coordinate systems associated with the one or more sensors; and converting one or more raw poses into the pose for including in the first signal, wherein the first pose is expressed in a common coordinate system.

7. The method of claim 6, wherein determining the first feature from the received sensory input comprises:

storing, in the first processor, identifiers of features of objects and information on the features of the objects; and determining the feature by comparing the features of the objects and the sensory input or a part of the sensory input.

8. The method of claim 1, further comprising:

storing models of objects in each of the one or more second processors, wherein the stored models are matched with the extracted pose and the extracted object information as part of the processing at the one or more second processors;

generating one or more lateral vote signals indicating likely identities of the object as determined by the processing at the one or more second processors, the one or more lateral vote signals complying with the communication protocol; and sharing the one or more lateral vote signals across the second processors.

9. The method of claim 8, further comprising generating an inference output by at least one of the second processors, the inference output indicating a result of inference, prediction on identity or construction of the object or content generated by the processing at least the extracted pose and the extracted object information.

10. An inference system comprising:

a first processor configured to:

generate a first signal that complies with a communication protocol that includes a a pose of an object or a feature of the object and object information identifying the object or the feature of the object, and send the first signal; and one or more second processors operably coupled to the first processor and configured to:

extract the pose and the object information indicated in the first signal, and process at least the extracted pose and the extracted object information to perform operations associated with inference.

11. The inference system of claim 10, the one or more second processors are further configured to:

generate a second signal that complies with the communication protocol in response to processing at least the extracted pose and the extracted object information; and send the second signal to one or more third processors in the inference system.

12. The inference system of claim 10, wherein the communication protocol further indicates:

confidence on the pose and the object information being accurate, and sender information indicating a type or identifier of the first signal.

13. The inference system of claim 12, wherein the communication protocol further indicates whether the pose and the object information are to be used in the operations associated with the inference.

14. The inference system of claim 10, wherein the first signal includes a plurality of messages, wherein each of the messages complies with the communication protocol and includes a pose of a different feature of the object.

15. The inference system of claim 10, wherein the first processor is further configured to:

receive sensory input from one or more sensors, determine the feature from the received sensory input, receive one or more raw poses of the feature of the object in local coordinate systems associated with the one or more sensors, and convert one or more raw poses into the pose for including in the first signal, wherein the first pose is expressed in a common coordinate system.

16. The inference system of claim 15, wherein the first processor is further configured to:

store identifiers of features of objects and information on the features of the objects; and determine the feature by comparing the features of the objects and the sensory input or a part of the sensory input.

17. The inference system of claim 10, wherein the one or more second processors are further configured to:

store models of objects in each of the one or more second processors, wherein the stored models are matched with the extracted pose and the extracted object information as part of the processing at the one or more second processors, generate one or more lateral vote signals indicating likely identities of the object as determined by the processing at the one or more second processors, the one or more lateral vote signals complying with the communication protocol, and share the one or more lateral vote signals across the one or more second processors.

18. The inference system of claim 17, wherein the one or more second processors are further configured to generate an inference output by at least one of the second processors, the inference output indicating a result of inference, prediction on identity or construction of the object or content generated by the processing the at least the extracted pose and the extracted object information.

19. A non-transitory computer readable storage medium storing instructions thereon, the instructions when executed by a first processor and one or more second processors to:

generate, by the first processor, a first signal that complies with a communication protocol that includes a pose of an object or a feature of the object and object information identifying the object or the feature of the object;

send the first signal to one or more second processors from the first processor to the one or more second processors;

extract, by the one or more second processors, the pose and the object information indicated in the first signal; and process, at the one or more second processors, at least the extracted pose and the extracted object information to perform operations associated with inference.

20. The non-transitory computer readable storage medium of claim 19, wherein the instructions further cause the one or more second processors to:

generate a second signal that complies with the communication protocol in response to processing at least the extracted pose and the extracted object information; and send the second signal to one or more third processors.

\* \* \* \* \*